(12) United States Patent
Morimoto et al.

(10) Patent No.: US 10,538,021 B2
(45) Date of Patent: Jan. 21, 2020

(54) INJECTION MOLD

(71) Applicant: PANASONIC INTELLECTUAL PROPERTY MANAGEMENT CO., LTD., Osaka (JP)

(72) Inventors: Masanori Morimoto, Osaka (JP); Satoshi Abe, Osaka (JP); Masataka Takenami, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 351 days.

(21) Appl. No.: 15/515,418

(22) PCT Filed: Sep. 29, 2015

(86) PCT No.: PCT/JP2015/004949
§ 371 (c)(1),
(2) Date: Mar. 29, 2017

(87) PCT Pub. No.: WO2016/051778
PCT Pub. Date: Apr. 7, 2016

(65) Prior Publication Data
US 2017/0217068 A1    Aug. 3, 2017

(30) Foreign Application Priority Data
Sep. 30, 2014  (JP) .................................. 2014-201903

(51) Int. Cl.
*B29C 45/34* (2006.01)
*B01D 39/16* (2006.01)
(Continued)

(52) U.S. Cl.
CPC ........ *B29C 45/345* (2013.01); *B01D 39/1692* (2013.01); *B01D 46/0001* (2013.01);
(Continued)

(58) Field of Classification Search
CPC .......... B29C 2045/0034; B29C 33/005; B29C 2033/422; B29C 33/38; B29C 45/345;
(Continued)

(56) References Cited

U.S. PATENT DOCUMENTS

| 1,271,296 A | 7/1918 | Everett |
| 1,317,333 A | 9/1919 | Sturges |

(Continued)

FOREIGN PATENT DOCUMENTS

| CN | 1347777 | 5/2002 |
| GB | 2 242 644 | 9/1991 |

(Continued)

OTHER PUBLICATIONS

Office Action issued in China Counterpart Patent Appl. No. 201580052865.5, dated Aug. 27, 2018, along with an English translation thereof.

(Continued)

*Primary Examiner* — Jacob T Minskey
*Assistant Examiner* — Cedrick S Williams
(74) *Attorney, Agent, or Firm* — Greenblum & Bernstein, P.L.C.

(57) ABSTRACT

To provide an injection mold capable of filling a necessary resin material for obtaining a desired molded article in a cavity space of a fine mesh structure, there is provided an injection mold according to an embodiment of the present invention composed of a core mold and a cavity mold, in which a cavity space is formed when the core and cavity molds are in a contact with each other, the cavity space surrounding a plurality of contact areas between the core and cavity molds. In the injection mold according to an embodiment of the present invention, at least one of the core and cavity molds has a through-hole which has an opening in a parting plane of the core and cavity molds and extends from (Continued)

the opening to an outside of the injection mold, the parting plane corresponding to the contact areas between the core and cavity molds.

13 Claims, 9 Drawing Sheets

(51) Int. Cl.
*B01D 46/00* (2006.01)
*B29C 33/38* (2006.01)
*B29C 45/26* (2006.01)
*B29L 31/14* (2006.01)

(52) U.S. Cl.
CPC ........ *B29C 33/3842* (2013.01); *B29C 45/263* (2013.01); *B29C 45/2624* (2013.01); *B29K 2905/00* (2013.01); *B29L 2031/14* (2013.01)

(58) Field of Classification Search
CPC . B29C 45/263; B29C 45/34; B29L 2031/737; B01D 46/0001
See application file for complete search history.

(56) References Cited

U.S. PATENT DOCUMENTS

| 4,990,077 | A | 2/1991 | Morita | |
|---|---|---|---|---|
| 2006/0057244 | A1* | 3/2006 | Jahn | B29C 45/2628 425/467 |
| 2011/0045120 | A1* | 2/2011 | Higashi | B22F 5/007 425/552 |
| 2016/0131033 | A1* | 5/2016 | Herrmann | B01D 46/125 |

FOREIGN PATENT DOCUMENTS

| JP | 63-247015 | | 10/1988 | |
| JP | 4-29023 | | 3/1992 | |
| JP | 6-320581 | | 11/1994 | |
| JP | 7-117083 | | 5/1995 | |
| JP | 7117083 | * | 5/1995 | ............ B29C 45/37 |
| JP | 7-284617 | | 10/1995 | |
| JP | 8-267517 | | 10/1996 | |
| JP | 9-290422 | | 11/1997 | |
| JP | 10-193405 | | 7/1998 | |
| JP | 11-277586 | | 10/1999 | |
| JP | 2002-86510 | | 3/2002 | |
| JP | 2004-25819 | | 1/2004 | |
| JP | 2005-306006 | | 11/2005 | |
| JP | 2013-233732 | | 11/2013 | |
| JP | 2014-113809 | | 6/2014 | |

OTHER PUBLICATIONS

Search Report issued in International Bureau of WIPO Patent Application No. PCT/JP2015/004949, dated Dec. 15, 2015.
International Preliminary Report on Patentability for PCT/JP2015/004949, dated Apr. 4, 2017.
Office Action issued in Taiwan Counterpart Patent Appl. No. 104131338, dated Aug. 14, 2017, along with an English language traslation thereof.
Search Report issued in European Patent Office (EPO) Patent Application No. 15845830.7 and English translation thereof, dated Sep. 6, 2017.

* cited by examiner

INJECTION MOLD

TECHNICAL FIELD

The disclosure relates to an injection mold. Particularly, the disclosure relates to the injection mold for obtaining a molded article in a form of a filter.

BACKGROUND OF THE INVENTION

Techniques serving as a foundation of a manufacturing industry in Japan includes a molding technique. The molding technique includes a method for an injection-molding, a method for a compression-molding, and a method for an extrusion-molding for example. In these methods, the method for the injection-molding is a method for injecting a melt resin in an injection mold, followed by cooling and subsequently solidifying the melt resin to obtain a molded article.

Recently, a demand for an air purifier has been increased in accordance with a degradation of an air environment. The air purifier has a molded article in a form of a filter for catching suspended substances in an atmosphere, the molded article corresponding to a filter part. The molded article in the form of the filter is obtained by the injection mold having a cavity space of a fine mesh structure. A melt resin is needed to be injected in the cavity space having the fine mesh structure in the injection mold to obtain the molded article in the form of the filter. However, the fine mesh structure of the cavity space is likely to result in a remaining of a gas arising from the melt resin in the cavity space.

In this regard, Patent document 1 discloses an injection mold in which a nested part composed of a vent part surrounds a cavity space. In the injection mold of the Patent document 1, a gas in the cavity space is discharged through the vent part surrounding the cavity space. Specifically, when a melt resin is injected into the cavity space under a condition of a vacuum, the gas in the cavity space is discharged through the vent part to a vent passage which is on a condition of a reduced pressure.

PATENT DOCUMENTS (RELATED ART PATENT DOCUMENTS)

PATENT DOCUMENT 1: Japanese Unexamined Patent Application Publication No. H11-277586

DISCLOSURE OF THE INVENTION

Problems to be Solved by the Invention

As described above, since the gas in the cavity space is discharged through the vent part to the vent passage which is on the condition of the reduced pressure at a point in time when the melt resin is injected into the cavity space, the melt resin may block pores of the vent part and thus the gas in the cavity space cannot be sufficiently discharged through the vent part, which leads to an adherence and a deposition of a deposit caused by the gas to a surface forming the cavity space. Due to the adherence and the deposition of the deposit to the surface forming the cavity space, the cavity space of the fine mesh structure may not be filled with a necessary resin material for obtaining a desired molded article in the form of the filter. Accordingly, the molded article in the form of the filter with a desired shape cannot be obtained.

An object of the present invention is to provide the injection mold which is capable of filling the necessary resin material for obtaining a desired molded article in the cavity space of the fine mesh structure.

Means for Solving the Problems

In order to achieve the above object, an embodiment of the present invention provides an injection mold composed of a core mold and a cavity mold, in which a cavity space is formed when the core and cavity molds are in a contact with each other, the cavity space surrounding a plurality of contact areas between the core and cavity molds, wherein at least one of the core and cavity molds has a through-hole which has an opening in a parting plane of the core and cavity molds and extends from the opening to an outside of the injection mold, the parting plane corresponding to the contact areas between the core and cavity molds.

Effect of the Invention

In the injection mold according to an embodiment of the present invention, at least one of the core and cavity molds has a through-hole in the parting plane of the core and cavity molds, the through-hole extending to the outside of the injection mold. Due to the through-hole, the gas in the cavity space passes through a clearance in which the melt resin cannot be flowed, followed by being discharged through the through-hole which is spaced apart from the cavity space to the outside of the injection mold, the clearance being formed in a region of the parting plane corresponding to the contact areas between the core and cavity molds. The clearance allows a blocking of the through-hole by the melt resin to be prevented, and thus the gas in the cavity space can be effectively discharged to the outside of the injection mold, which leads to a prevention of the adherence and the deposition of the deposit caused by the gas to a surface forming the cavity space. Thus, the prevention of the adherence and the deposition of the deposit to the surface forming the cavity space allows the cavity space to be filled with a necessary resin material to be needed to obtain the desired molded article in the form of the filter. Accordingly, the molded article in the form of the desired filter can be obtained.

MODES FOR CARRYING OUT THE INVENTION

Figure 1:
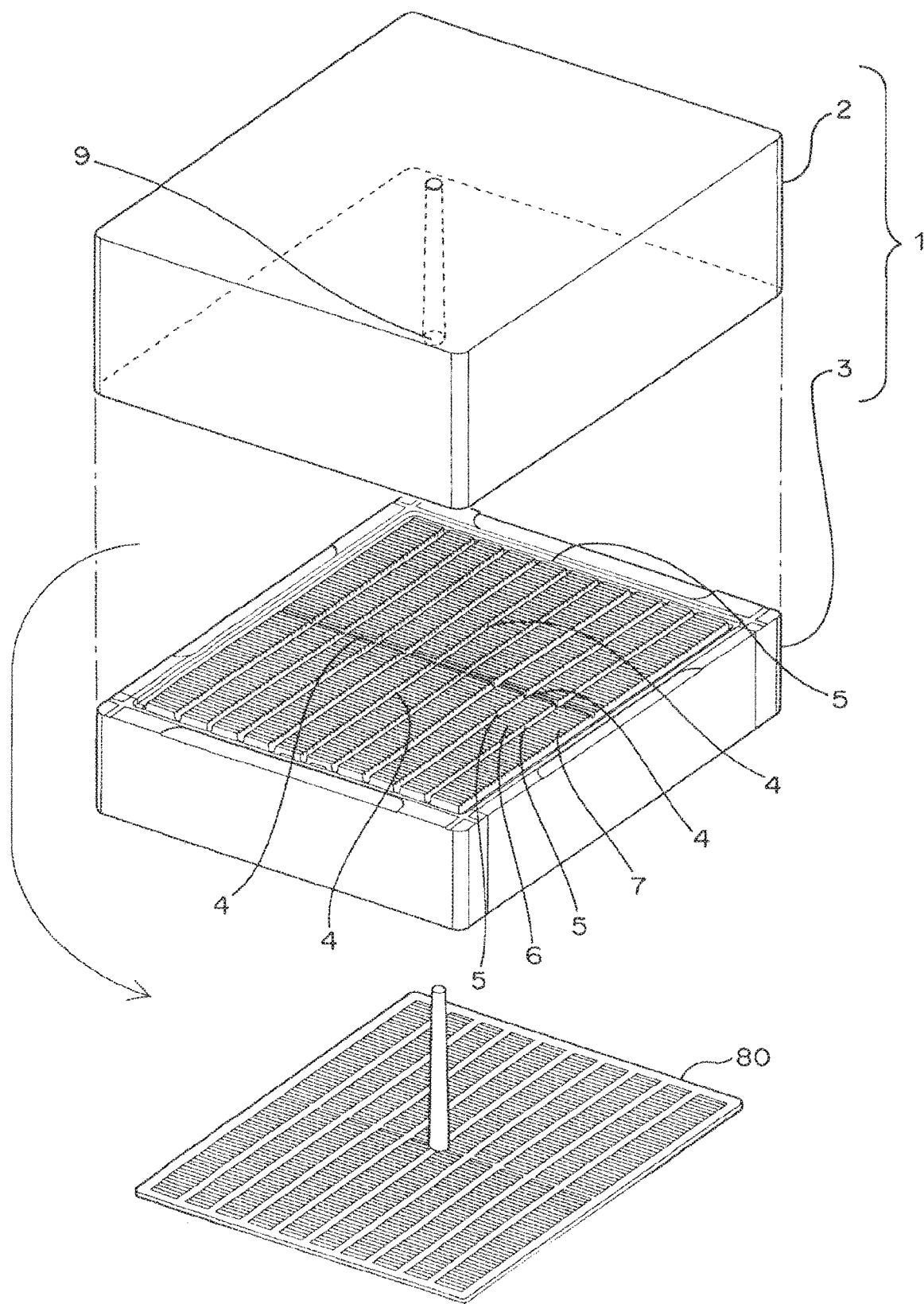
FIG. 1 is a perspective view schematically illustrating an injection mold according to an embodiment of the present invention and a molded article in a form of a filter obtained by the injection mold.

The injection mold according to an embodiment of the present invention will be described. It should be noted that configurations and dimensions of elements in the drawings are merely shown for illustrative purposes, and thus they are not same as those of the elements.

FIG. 1 is the perspective view schematically illustrating the injection mold according to an embodiment of the present invention.

The injection mold 1 according to an embodiment of the present invention is a mold used for obtaining a molded article 80 in the form of the filter, the molded article having a fine mesh structure. The injection mold 1 according to an embodiment of the present invention comprises a cavity mold 2 and a core mold 3 as shown in FIG. 1. The injection mold 1 according to an embodiment of the present invention comprises the core mold 3 with a characteristic structure. Thus, the core mold 3 composing the injection mold 1 according to an embodiment of the present invention will be described with reference to the drawings. The phrase "resin-passage" as used herein means a passage through which a melt resin passes, the passage being provided in the core mold 3 composing the injection mold 1 according to an embodiment of the present invention. The phrase "cavity space" as used herein means a space for injecting and subsequently filling the melt resin, the space being provided at a point in time when the cavity mold 2 and the core mold 3 composing the injection mold 1 according to an embodiment of the present invention are in a contact with each other. Specifically, the phrase "cavity space" as used herein means a space for injecting and subsequently filling the melt resin, the space being provided at a point in time when the core mold 3 having the resin-passage is in a contact with the cavity mold 2 having a flat surface which is opposed to an opening region of the resin-passage provided in the core mold 3. Accordingly, a space of the resin-passage has the same dimension as that of the cavity space.

The core mold 3 comprises a plurality of first resin-passages 4, one end of each of which being in a connection with a gate 9 corresponding to an inlet for injecting a melt resin; a plurality of second resin-passages 5, one end of each of which being in a connection with each of the first resin-passages; and a plurality of third resin-passages 6, each of which being in a connection with the second resin-passages adjacent to each other. As shown in FIG. 1, the first resin-passages 4 in the core mold 3 correspond to main passages in a direct connection with the gate 9, the main passages serving to firstly inject the melt resin. As shown in FIG. 1, the first resin-passages 4 may be four passages radially extending from the gate 9. The second resin-passages 5 are provided such that one end of each of them is in a connection with each of the first resin-passages 4 and each of them extends to a different direction (i.e., a bent direction) from an extension direction of each of the first resin-passages 4. For example, as shown in FIG. 1, the second resin-passages 5 may correspond to a plurality of sub passages, the sub passages being respectively oriented to a direction which is perpendicular to the extension direction of each of the first resin-passages 4, the sub passages being branched from each of the first resin-passages 4. Furthermore, the third resin-passages 6 are provided such that one end of each of them is in a connection with each of the second resin-passages 5 and each of them extends to a different direction (i.e., a bent direction) from an extension direction of each of the second resin-passages 5. For example, as shown in FIG. 1, the third resin-passages 6 may correspond to a plurality of sub passages, the sub passages being respectively oriented to a direction which is perpendicular to the extension direction of each of the second resin-passages 5, the sub passages being branched from each of the second resin-passages 5. Namely, the second resin-passage 5 corresponds to a passage which extends to be once bent from the first resin passage, and the third resin-passage 6 corresponds to a passage which extends to be twice bent from the first resin passage. As shown in FIG. 1, each of the third resin-passages 6 is provided such that other of the ends of each of the third resin-passages 6 is in a connection with the second resin-passage, which means that the third resin-passage is in a connection with the second resin-passage adjacent to each other. Accordingly, passages for obtaining the molded article 80 having the fine mesh structures are provided, the passages being in a form of a mesh. Furthermore, as shown in FIG. 1, a resin-passage provided in an outer edge of the core mold 3 corresponds to a second resin-passage, the resin-passage provided in the outer edge being provided such that one end of the resin-passage is in a connection with the first resin-passage 4 extending to the outer edge of the core mold 3 in one direction and the resin-passage extends to a different direction (i.e., a bent direction) from an extension direction of the first resin-passage 4.

As described above, the cavity space corresponds to a space for injecting and subsequently filling the melt resin, the space being provided at a point in time when the core mold 3 having the resin-passage is in a contact with the cavity mold 2 having a flat surface, the flat surface being opposed to an opening region of the resin-passage provided in the core mold 3. Thus, the space of the resin-passage has the same dimension as that of the cavity space. In light of the above matters, the cavity space comprises a plurality of first cavity spaces, one end of each of which being in a connection with the gate 9 corresponding to the inlet for injecting the melt resin; a plurality of second cavity spaces, one end of each of which being in a connection with each of the first cavity spaces; and a plurality of third cavity spaces, each of which being in a connection with the second cavity spaces adjacent to each other. Please note that the first cavity space corresponds to the first resin-passage 4, the second cavity space corresponds to the second resin-passage 5, and the third cavity space corresponds to the third resin-passage 6 at a point in time before the core mold 3 is in a contact with the cavity mold 2.

Figure 2:
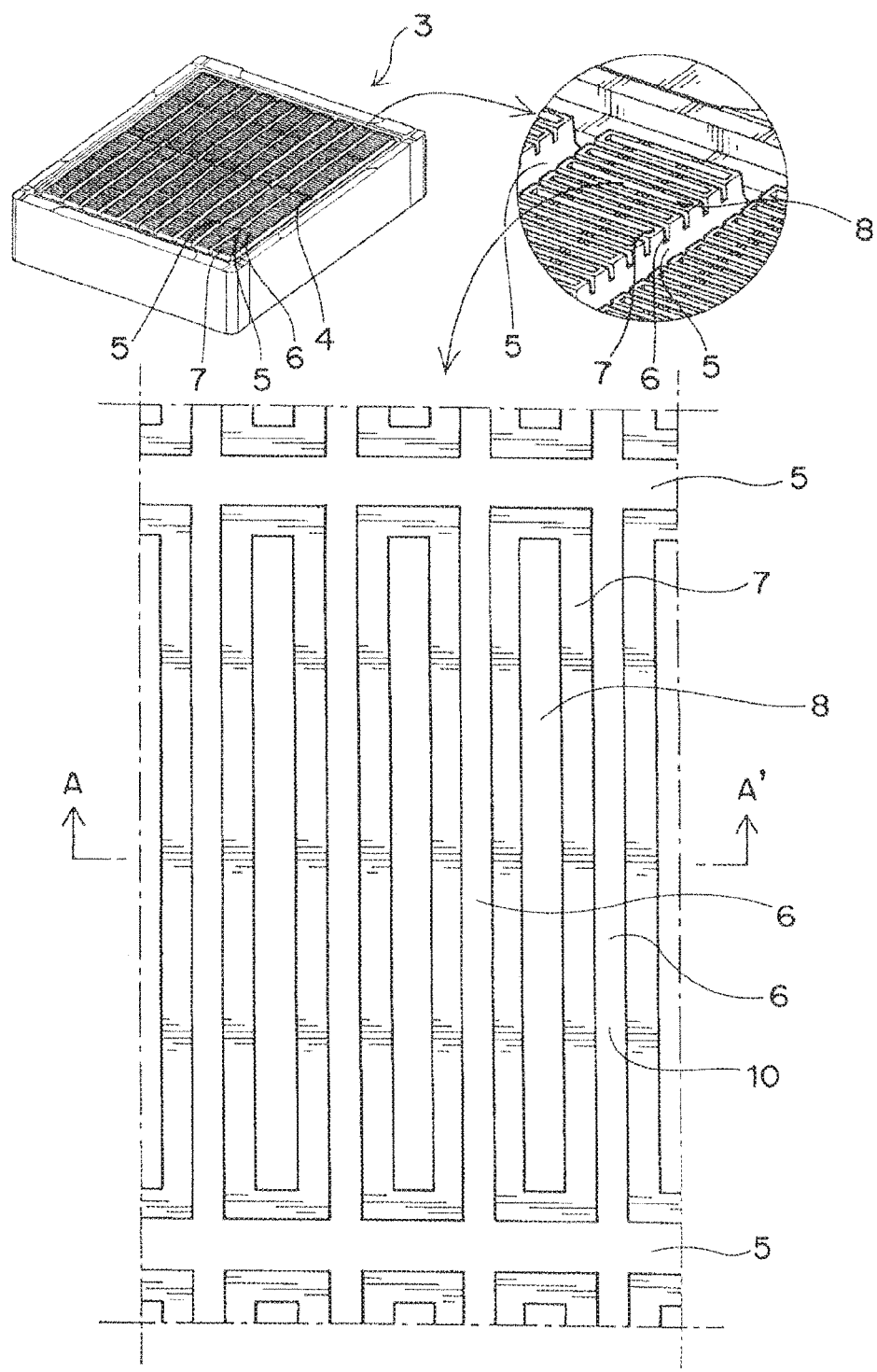
FIG. 2 is a partially enlarged plan view of a core mold composing the injection mold according to an embodiment of the present invention.
Figure 3:
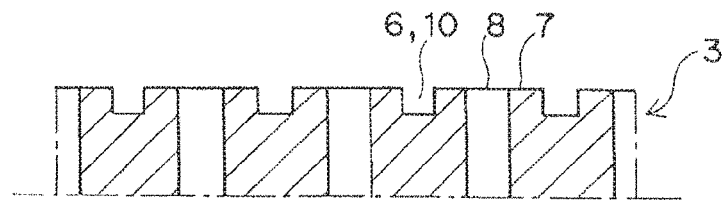
FIG. 3 is a partially enlarged cross-sectional view of the core mold composing the injection mold according to an embodiment of the present invention, the partially enlarged cross-sectional view being in line with a line segment A-A' in FIG. 2.

FIG. 2 is a partially enlarged plan view of the core mold 3 composing the injection mold 1 according to an embodiment of the present invention. FIG. 3 is a partially enlarged cross-sectional view of the core mold 3 composing the injection mold 1 according to an embodiment of the present invention, the partially enlarged cross-sectional view being in line with a line segment A-A' in FIG. 2. When it is not necessary to distinguish the first resin-passage 4, the second resin-passage 5, and the third resin-passage 6 from, each other, the phrase "resin-passage 10" as used herein will be used. As shown in FIGS. 2 and 3, the core mold 3 comprises sub-parting planes 7, each of the sub-parting plane serving as a contact area between the core and cavity molds, each of the sub-parting plane being surrounded by the second resin-passages 5 adjacent to each other and the third resin-passages 6 adjacent to each other, each of the third resin-passages 6 being a connection with the second resin-passages 5 adjacent to each other; and another sub-parting planes 7, each of the another sub-parting plane 7 serving as a contact area between the core and cavity molds, each of the another sub-parting plane being surrounded by the first resin-passage 4, the second resin-passages 5 and the third resin-passage 6. As shown in FIG. 1, the core mold 3 has a plurality of sub-parting planes 7 at a region of the upper surface of the core mold 3. The core mold 3 has a through-hole 8 having an opening in the sub-parting plane 7. This is significant characteristics of the injection-mold 1 according to an embodiment of the present invention.

The through-hole 8 is a hole for discharging a gas in a cavity space to an outside of the injection mold, the cavity space being provided by the contact of the cavity mold 2 with the core mold 3. Specifically, the through-hole 8 is a hole for discharging the gas arising from a resin material through a narrow clearance to the outside of the injection mold, the resin material being injected and subsequently filled in the cavity space, the narrow clearance being provided in the sub-parting plane 7 which corresponds to a contact area between the cavity mold 2 and the core mold 3. As shown in FIG. 2, the through-hole 8 is spaced apart from the resin-passage 10, which means that the sub-parting plane 7 of the core mold 3 is positioned between the through-hole 8 and the resin-passage 10. Specifically, at a point in time when the cavity mold 2 and the core mold 3 are in a contact with each other, the through-hole 8 is spaced apart from the cavity space, which means that the sub-parting plane of the core and cavity molds are positioned between through-hole 8 and the cavity space, the sub-parting plane 7 corresponding to the contact area between the cavity mold 2 and the core mold 3. Thus, the gas in the cavity space passes through the narrow clearance provided in the region of the sub-parting plane 7, followed by being discharged through the through-hole 8 which is spaced apart from the cavity space to the outside of the injection mold. On the other hand, due to a relatively narrow clearance in the region of the sub-parting plane 7, the resin material can be prevented from passing through the clearance. Thus, the melt resin which is injected and subsequently filled in the cavity space does not block the through-hole 8, and thus only the gas in the cavity space can be effectively discharged, which contributes to the prevention of the adherence and the deposition of the deposit caused by the gas to the surface forming the cavity space. Thus, the prevention of the adherence and the deposition of the deposit to the surface forming the cavity space allows the cavity space to be filled with the necessary resin material to be needed to obtain the desired molded article in the form of the filter. Accordingly, the molded article in the form of the desired filter can be obtained.

Furthermore, the through-hole 8 may have the opening dimension with 5 μm to 5 mm, for example, and preferably 50 μm to 500 μm in order to more discharge the gas in the cavity space from the cavity space to the outside of the injection mold. As shown in FIG. 2, it is preferable that the core mold 3 has a constant distance between an edge surface of the opening 15 of the through-hole 8 and all of inner side surfaces (i.e., all of edge surfaces) of the resin-passage 10. Thus, the constant distance allows a prevention for a variance of a discharge amount of the gas in a cavity space through a single through-hole 8 to the outside of the injection mold, the cavity space surrounding the sub-parting plane 7, the cavity space being formed by the contact of the cavity mold 2 with the core mold 3. Due to (i) the constant distance between the edge surface of the opening 15 of the through-hole 8 and all of the inner side surfaces of the resin-passage 10 and (ii) the narrow clearance provided in the region of the sub-parting plane corresponding to the contact area between the cavity mold 2 and the core mold 3, an intrusion of the melt resin from the cavity space into the through-hole 8 can be more evenly prevented.

The through-hole 8 may be provided in any of a plurality of the sub-parting planes 7 at the region of the upper surface of the core mold 3. It is preferable that the through-hole 8 is preferably provided in the sub-parting plane 7 near a local region of a cavity space at which the discharge of the gas in the cavity space is difficult, the cavity space being formed by the contact of the cavity mold 2 with the core mold 3. As described above, the second resin-passage 5 in the core mold 3 corresponds to a passage which extends to be once bent from the first resin passage 4, and the third resin-passage 6 corresponds to a passage which extends to be twice bent from the first resin passage 4. In this regard, it is considered that an increase of the number of bent portions in the resin-passage results in a decrease of a pressure for injecting the resin material, which means that the gas is likely to remain in a region having a large number of the bent portions in the resin-passage. Especially, the second resin-passages and the third resin-passages have a large number of the bent portions. Thus, it is preferable that the through-hole having the opening is at least provided in a sub-parting plane which is surrounded by the second resin-passages and the third resin-passages.

As shown in FIG. 1, it is more preferable that each of the through-holes is formed in each of the plurality of the sub-parting planes 7 at the region of the upper surface of the core mold 3. This means that each of the sub-parting planes 7 is provided at a position adjacent to each of all of resin-passages 10 in the upper surface of the core mold 3, the sub-parting planes having each a through-hole, the resin-passages 10 corresponding to all of the first resin-passage, the second resin-passage and the third resin-passage. Therefore, the gas in the cavity space can be more certainly discharged to outside of the injection mold.

Figure 4:
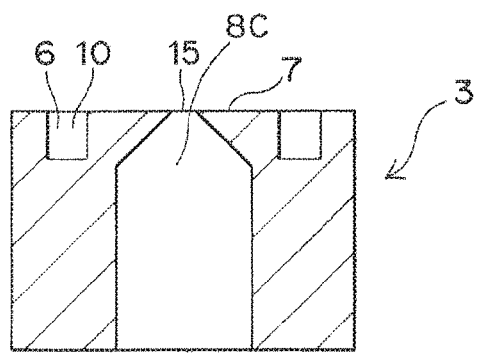
FIG. 4 is a cross sectional view schematically illustrating that a through-hole has an opening in a parting plane of the core mold composing the injection mold according to an embodiment of the present invention, the through-hole having a tapered structure toward the opening.

FIG. 4 is a cross sectional view schematically illustrating that a through-hole 8C has an opening in a sub-parting plane 7 of the core mold 3 composing the injection mold 1 according to an embodiment of the present invention, the through-hole 8C having a tapered structure toward the opening. As shown in FIG. 4, it is preferable that the through-hole 8C has a tapered structure in which a diameter of the through-hole 8C is decreased toward the opening 15 formed in the sub-parting plane 7. While not intending to be bound by any specific embodiments, the through-hole 8C has the opening 15 with its diameter of 0.5 µm to 500 µm, preferably 5 µm to 50 µm. The tapered structure of the through-hole 8C allows a prevention of an intrusion of contaminants into the through-hole 8C, the contaminants arising in the injection mold.

Figure 5:
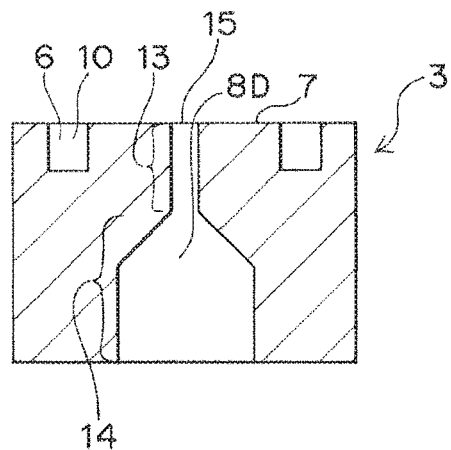
FIG. 5 is a cross sectional view schematically illustrating a through-hole having a tip portion, the through-hole having the opening in the parting plane of the core mold composing the injection mold according to an embodiment of the present invention.

FIG. 5 is a cross sectional view schematically illustrating a through-hole 8D having a tip portion 13, the through-hole 8D having the opening in the sub-parting plane 7 of the core mold 3 composing the injection mold 1 according to an embodiment of the present invention. As shown in FIG. 5, it is preferable that the through-hole 8D having the opening in the sub-parting plane 7 of the core mold 3 comprises a tip portion 13 and an internal portion 14, the tip portion 13 having one of the ends in a connection with the opening 15 of the through-hole 8D, the internal portion 14 being in a connection with other of the ends of the tip portion 13. The tip portion 13 extends from the opening 15 of the through-hole 8D to the internal portion 14 of the through-hole 8D. The internal portion 14 as shown in FIG. 5 is a portion other than the tip portion 13 of the through-hole 8D. Specifically, a tip portion 13 extends from the opening 15 of the through-hole 8D to the internal portion 14 of through-hole 8D, the tip portion 13 having an extension length of 1 µm to 50 mm, preferably 5 µm to 10 mm. As shown in FIG. 5, it is also preferable that the tip portion 13 of the through-hole 8D has a diameter which is smaller than that of the internal portion 14 of the through-hole 8D. While not intending to be bound by any specific embodiments, the through-hole 8D has the opening 15 with its diameter of 0.5 µm to 500 µm, preferably 5 µm to 50 µm. The through-hole 8D may comprise the tip portion 13 having its same diameter dimension from one of the ends of the through-hole 8D to other of the ends of the through-hole 8D. As described above, a tip portion 13 of the through-hole 8D extends from the opening 15 of the through-hole 8D toward the internal portion 14 of the through-hole 8D, the tip portion 13 having a predetermined length. The tip portion 13 of the through-hole 8D has a diameter which is smaller than that of the internal portion 14 of through-hole 8D. The dimension of diameter of the tip portion 13 allows a prevention of an intrusion of the contaminants in the injection mold together with the gas into the through-hole 8D. The dimension of diameter of the tip portion 13 also allows strength and resistance properties of the core mold 3 to be improved.

Figure 6:
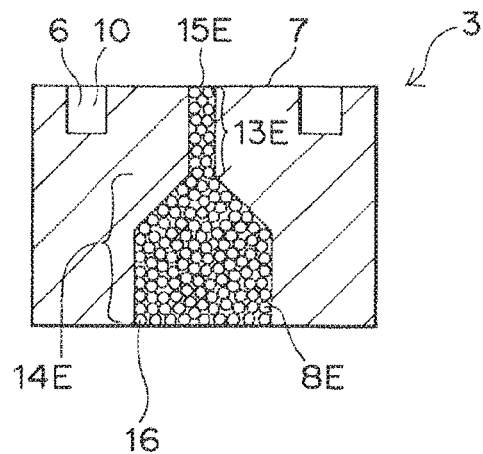
FIG. 6 is a cross sectional view schematically illustrating that a melted and subsequently solidified metal powder is provided within the through-hole having the opening in the parting plane of the core mold composing the injection mold according to an embodiment of the present invention.

FIG. 6 is a cross sectional view schematically illustrating that a melted and subsequently solidified metal powder 16 is provided within a through-hole 8E having the opening in the sub-parting plane 7 of the core mold 3 composing the injection mold 1 according to an embodiment of the present invention, the metal powder 16 having a function as a filter. As shown in FIG. 6, the through-hole 8E is filled with the melted and subsequently solidified metal powder 16, the metal powder 16 serving as the filter. This means that the metal powder 16 is melted and subsequently solidified such that the gas in the cavity space can pass through the through-hole 8E from the opening 15E of the through-hole 8E to the outside of the injection mold. For example, it is preferable that the metal powder 16 is melted and subsequently solidified in order to obtain a low density portion having its solidified density of 0 to 95% (excluding 95%), preferably 0 to 50%. Therefore, the gas in the cavity space can pass through the through-hole 8E from the opening 15E of the through-hole 8E to the outside of the injection mold.

When a pressure from the outside to the core mold 3 is provided, the pressure is oriented to an inside region of the core mold 3. Especially, when the pressure is oriented to the inside region of the core mold 3 which has a plurality of through-holes each having a space, a configuration of each of the plurality of the through-holes 8E cannot be maintained. This leads to a decrease of the strength and resistance properties of the core mold 3. In an embodiment of the present invention, the through-hole 8E is filled with the melted and subsequently solidified metal powder 16. Thus, the configuration of the through-hole 8E can be maintained even if the pressure oriented to the inside region of the core mold 3 is provided, which allows the strength and resistance properties of the core mold 3 to be improved. In light of the above matters, the metal powder 16 can serve as a reinforcement part for improving the strength and resistance properties of the core mold 3. The metal powder 16 may be provided in the through-hole 8E without being melted and subsequently solidified.

As shown in FIG. 6, the through-hole 8E comprises a tip portion 13E and an internal portion 14E, the tip portion 13E having one of the ends of the tip portion 13E in a connection with the opening 15E of the through-hole 8E, the internal portion 14E being in a connection with other of the ends of the tip portion 13E. The tip portion 13E extends from the opening 15E of the through-hole 8E to the internal portion 14E of the opening 15E. The tip portion 13E has an extension length of 1 µm to 50 mm, preferably 5 µm to 10 mm. The internal portion 14E as shown in FIG. 6 is a portion other than the tip portion 13E in the through-hole 8E. As shown in FIG. 6, the tip portion 13E of the through-hole 8E has a diameter which is smaller than that of the internal portion 14E of the through-hole 8E. While not intending to be bound by any specific embodiments, the through-hole 8E has the opening 15E having its diameter of 0.5 µm to 500 µm, preferably 5 µm to 50 µm. The dimension of diameter of the tip portion 13E allows a prevention of an intrusion of contaminants together with the gas in the cavity space into the through-hole 8E, the contaminants arising in the injection mold. As described above, the tip portion 13E of the through-hole 8E extends from the opening 15E of the through-hole 8E toward the internal portion 14E of the through-hole 8E by a predetermined length, which allows the strength and resistance properties of the core mold 3 to be improved.

Figure 7:
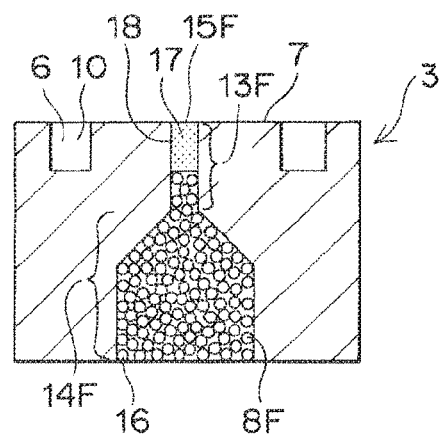
FIG. 7 is a cross sectional view schematically illustrating an embodiment wherein the melted and subsequently solidified metal powder and a porous part are provided within the through-hole having the opening in the parting plane of the core mold composing the injection mold according to an embodiment of the present invention.

FIG. 7 is a cross sectional view schematically illustrating an embodiment wherein a melted and subsequently solidified metal powder 16 and a porous part 17 are provided within a through-hole 8F having the opening in the sub-parting plane 7 of the core mold 3 composing the injection mold 1 according to an embodiment of the present invention, the porous part 17 having a superior function as a filter. As shown in FIG. 7, the through-hole 8F comprises a tip portion 13F and an internal portion 14F, the tip portion 13F having one of the ends in a connection with the opening 15F of the through-hole 8F, the internal portion 14F being in a connection with other of the ends of the tip portion 13F. The tip portion 13F extends from the opening 15F of the through-hole 8F to the internal portion 14F of the through-hole 8F, the tip portion 13F having an extension length of 1 µm to 50 mm, preferably 5 µm to 10 mm. The internal portion 14F as shown in FIG. 7 means a portion other than the tip portion 13F in the through-hole 8F. As shown in FIG. 7, the tip portion 13F of the through-hole 8F has a diameter which is smaller than that of the internal portion 14F of the through-hole 8F. While not intending to be bound by any specific embodiments, the through-hole 8F has the opening 15F with its diameter of 0.5 µm to 500 µm, preferably 5 µm to 50 µm. Furthermore, the through-hole 8F comprises a porous part 17 therein, the porous part 17 serving to block the opening 15F of the through-hole 8F. The porous part 17 has a large number of pores 18, each of the pores 18 having a diameter which allows the gas in the cavity space to pass through the through-hole 8F from the opening of the through-hole 8F to the outside of the injection mold. While not intending to be bound by any specific embodiments, the porous part 17 may have the pores 18, each of which has a diameter of 0.1 µm to 1.0 µm. As described above, the through-hole 8F has the opening 15F with its small diameter and the through-hole 8F comprises the porous part 17 serving to block the opening 15F of the through-hole 8F, which allows an intrusion of contaminants together with the gas in the cavity space into the through-hole 8F to be more prevented, the contaminants arising in the injection mold.

As shown in FIG. 7, a main portion of the through-hole 8F is filled with the melted and subsequently solidified metal powder 16. The filling of the melted and subsequently solidified metal powder 16 into the through-hole 8F allows the strength and resistance properties of the through-hole 8F to be maintained or improved, which means that the strength and resistance properties of the injection mold can be maintained or improved as a whole. As described above, the tip portion 13F extends from the opening 15F of the through-hole 8F to the internal portion 14F of the through-hole 8F, the tip portion 13F having the extension length of 1 µm to 50 mm, preferably 5 µm to 10 mm. It means that the tip portion 13F of the through-hole 8F extends from the opening 15F of the through-hole 8F toward the internal portion 14F of the through-hole 8F by a predetermined length, which allows the strength and resistance properties of the core mold 3 to be improved.

Figure 8:
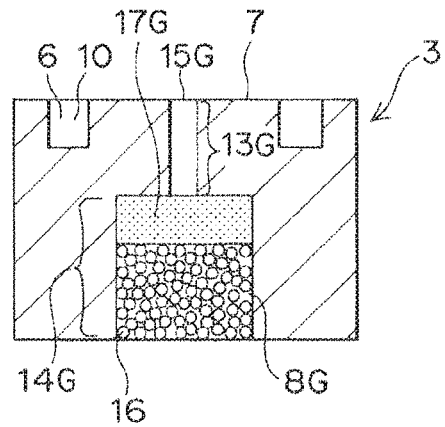
FIG. 8 is a cross sectional view schematically illustrating an another embodiment wherein the melted and subsequently solidified metal powder and a porous part are provided within the through-hole having the opening in the parting plane of the core mold composing the injection mold according to an embodiment of the present invention.

FIG. 8 is a cross sectional view schematically illustrating an embodiment wherein a melted and subsequently solidified metal powder 16 and a porous part 17G are provided within a through-hole 8G having the opening in the sub-parting plane 7 of the core mold 3 composing the injection mold 1 according to an embodiment of the present invention. As shown in FIG. 8, the through-hole 8G comprises a tip portion 13G and an internal portion 14G, one of the ends of the tip portion 13G being in a connection with the opening 15G of the through-hole 8G, the internal portion 14G being in a connection with other of the ends of the tip portion 13G. The internal portion 14G as shown in FIG. 8 means a portion other than the tip portion 13G of the through-hole 8G. An embodiment of FIG. 8 is different from that of FIG. 7. Specifically, the porous part 17G serves to block a part of the internal portion 14G of the through-hole 8G. The phrase "a part of the internal portion 14G of the through-hole 8G" as used herein corresponds to a region in line with a diameter direction of the internal portion 14G. The porous part 17G has a large number of pores 18G, each of the pores 18G having a diameter which allows the gas in the cavity space to be discharged to the outside of the injection mold. Specifically, while not intending to be bound by any specific embodiments, the porous part 17G may have the pores 18G with its diameter of 0.1 µm to 1.0 µm.

While not intending to be bound by any specific embodiments, a tip portion 13G extends from the opening 15G of the through-hole 8G to the internal portion 14G of the through-hole 8G, the tip portion 13G having an extension length of 1 µm to 50 mm, preferably 5 µm to 10 mm. As shown in FIG. 8, the tip portion 13G of the through-hole 8G has a diameter which is smaller than that of the internal portion 14G of the through-hole 8G. While not intending to be bound by any specific embodiments, the through-hole 8G has the opening 15G with its diameter of 0.5 µm to 500 µm, preferably 5 µm to 50 µm.

The through-hole 8G having the opening 15G with its small diameter allows a prevention of an intrusion of contaminants together with the gas in the cavity space into the through-hole 8G, the contaminants arising in the injection mold. Even if the through-hole 8G has the opening 15G with its small diameter, the contaminants may intrude into the through-hole 8G. In this regard, the porous part 17G blocks a part of the internal portion 14G of the through-hole 8G. Accordingly, the discharge of the contaminants through the porous part 17G to the outside of the injection mold can be prevented even if the contaminants intrude into the through-hole 8G.

As shown in FIG. 8, the internal portion 14G of the through-hole 8G is filled with the melted and subsequently solidified metal powder 16. The filling of the metal powder 16 into the internal portion 14G allows the strength and resistance properties of the internal portion 14G of the through-hole 8G to be maintained or improved. As described above, the tip portion 13G extends from the opening 15G of the through-hole 8G toward the internal portion 14G of the through-hole 8G by a predetermined length, which leads to an improvement of the strength and resistance properties of the core mold 3. As shown in FIG. 8, the tip portion 13G of the through-hole 8G does not have the melted and subsequently solidified metal powder 16. In view of an improvement of the strength and resistance properties of the tip portion 13G of the through-hole 8G (i.e., the core mold 3), the tip portion 13G of the through-hole 8G may be filled with the melted and subsequently solidified metal powder 16.

Figure 9:
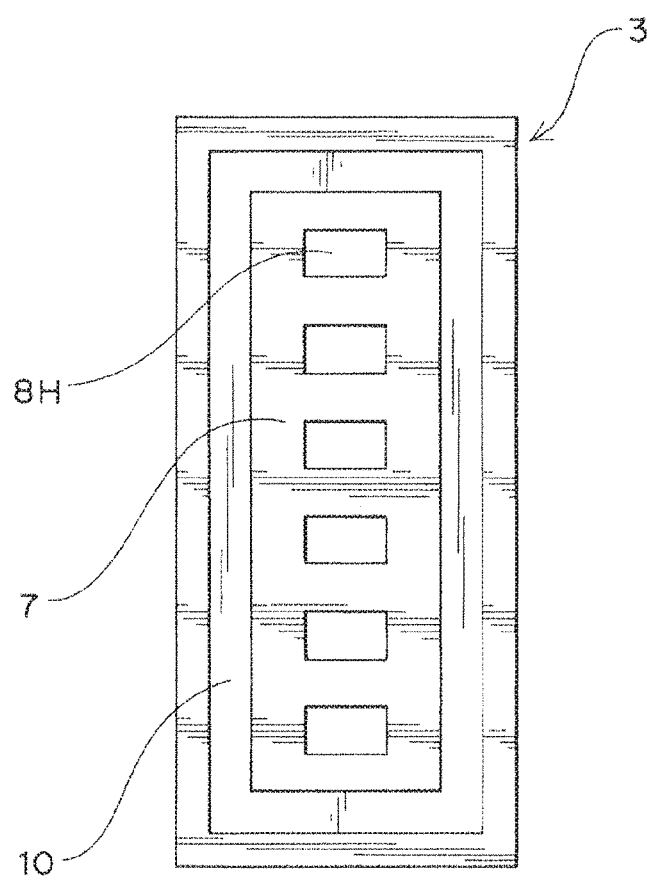
FIG. 9 is a plan view schematically illustrating that the core mold composing the injection mold according to an embodiment of the present invention has a plurality of the through-holes in a sub-parting plane serving as a contact area between the core and cavity molds.

FIG. 9 is a plan view schematically illustrating that a plurality of the through-holes 8H are provided in a single sub-parting plane 7 of the core mold 3 composing the injection mold 1 according to an embodiment of the present invention. As shown in FIG. 9, it is preferable that a plurality of the through-holes 8H are provided in the single sub-parting plane 7 of the core mold 3 composing the injection mold 1 according to an embodiment of the present invention. A resin-passage 10 surrounds the sub-parting plane 7 as shown in FIG. 9. Compared to a provision of only the one through-hole 8H in the single sub-parting plane 7, a provision of a plurality of the through-holes 8H in the single sub-parting plane 7 allows the further discharge of the gas in the cavity space through the plurality of the through-holes 8H to the outside of the injection mold. In view of the more discharge of the gas in the cavity space from the cavity space to the outside of injection mold, each of the through-holes 8H may have an opening-dimension of 5 µm to 5 mm. It is preferable that each of the through-holes 8H has the opening-dimension of 50 µm to 500 µm. FIG. 9 shows that each of the through-holes 8H has a cross sectional shape of a square. While being not limited to the above embodiment, the cross sectional shape of the through-hole 8H may be selected from a variety of cross sectional shapes of a circular, a triangle and a rhombus, for example.

Figure 10:
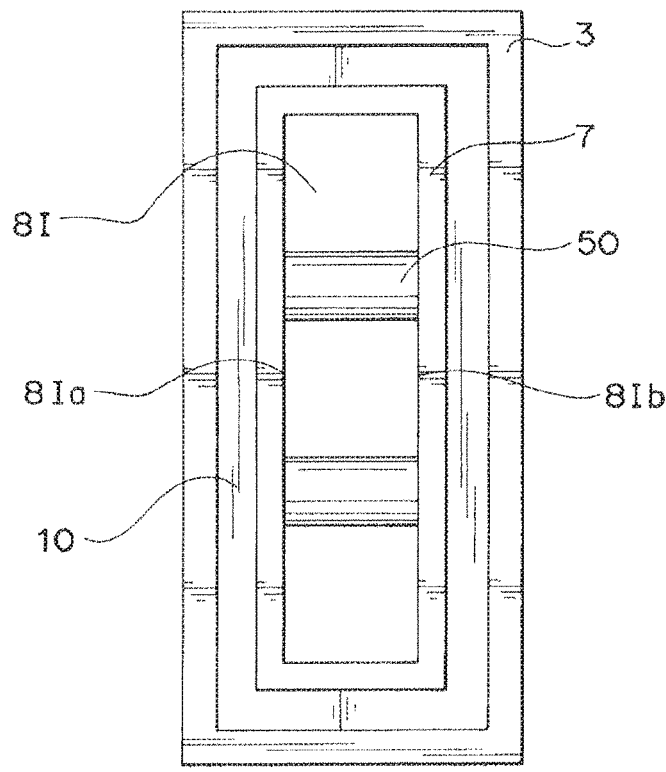
FIG. 10 is a plan view schematically illustrating that a connection part is provided in the through-hole having the opening in the parting plane of the core mold composing the injection mold according to an embodiment of the present invention.
Figure 11:
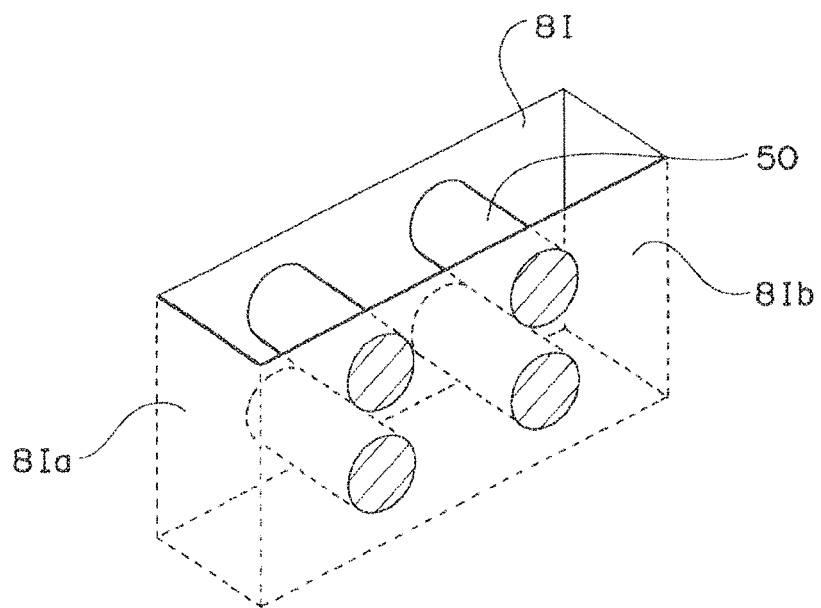
FIG. 11 is a perspective view schematically illustrating that a connection part is provided in the through-hole having the opening in the parting plane of the core mold composing the injection mold according to an embodiment of the present invention.

FIG. 10 is a plan view schematically illustrating that a connection part is provided in the through-hole 8I having the opening in the sub-parting plane 7 of the core mold 3 composing the injection mold 1 according to an embodiment of the present invention. FIG. 11 is a perspective view schematically illustrating that a connection part is provided in the through-hole 8I having the opening in the sub-parting plane 7 of the core mold 3 composing the injection mold 1 according to an embodiment of the present invention, the connection part serving to prevent a deformation of a shape of the through-hole 8I. It is preferable that the through-hole 8I has connection parts 50 therein, each of the connection parts 50 serving to interconnect side surfaces of the through-hole 8I. As shown in FIGS. 10 and 11, a side surface 8Ia which is one of the side surfaces of the through-hole 8I and a side surface 8Ib which is other of the side surfaces of the through-hole 8I are in a connection with each other via the connection part 50. As shown in FIGS. 10 and 11, when a pressure from the outside to the core mold 3 is provided, the pressure is oriented to an inside region of the core mold 3. The through-hole 8I has a space for discharging the gas in the cavity space to the outside of the injection mold, which leads to a difficulty of a maintenance for a configuration of the through-hole 8I at a point in time when the pressure oriented to the inside region of the core mold 3 is provided. Thus, the strength and resistance properties of the core mold 3 may be decreased. In an embodiment of the present invention, the side surface 8Ia which is one of the side surfaces of the through-hole 8I and the side surface 8Ib which is other of the side surfaces of the through-hole 8I are in a connection with each other via the connection part 50. The connection part 50 allows a maintenance of the configuration of the through-hole 8I even if the pressure oriented to the inside region of the core mold 3 is provided. Thus, the strength and resistance properties of the core mold 3 can be improved. In light of the above matters, the connection part 50 serves as a "reinforcement-part" for improving the strength and resistance properties of the core mold 3.

Figure 12:
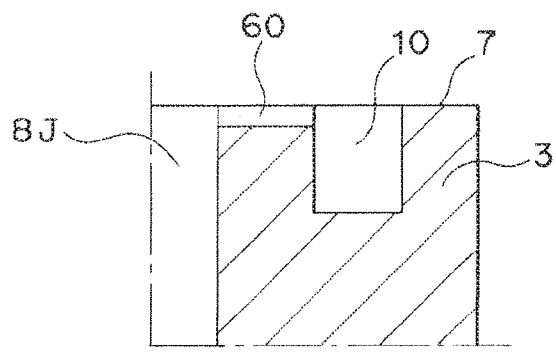
FIG. 12 is a cross sectional view schematically illustrating an embodiment wherein (i) the through-hole which has the opening in the parting plane of the core mold composing the injection mold according to an embodiment of the present invention and (ii) a resin-passage are in a connection with each other via a groove provided in the parting plane.

FIG. 12 is a cross sectional view schematically illustrating an embodiment wherein a through-hole 8J and a resin-passage 10 are in a connection with each other via a groove 60 in the sub-parting plane 7, the through-hole 8J having the opening in the sub-parting plane 7 of the core mold 3 composing the injection mold 1 according to an embodiment of the present invention. As shown in FIG. 12, it is preferable that the through-hole 8J and the resin-passage 10 are in a connection with each other via the groove 60 in the sub-parting plane 7. The gas in the cavity space passes through a narrow clearance corresponding to the contact area between the cavity mold 2 and the core mold 3, followed by being discharged through the through-hole 8J which is spaced apart from the cavity space to the outside of the injection mold, the narrow clearance being positioned at a region of the sub-parting plane 7. This means that the gas in the cavity space is not directly discharged from the cavity space to the outside of the injection mold. In this regard, the through-hole 8J and the resin-passage 10 are in a connection with each other via the groove 60 as shown in FIG. 12, which means that the groove 60 functions as a support part for promoting an orientation of the gas into the through-hole 8J. In view of a prevention for an intrusion of a melt resin together with the gas in the cavity space into the through-hole 8J, the groove 60 has a depth dimension of 1 µm to 100 µm, preferably 1 µm to 50 µm, the melt resin corresponding to a melt resin injected and subsequently filled in the cavity space. The phrase "depth dimension of the groove" as used herein means a length dimension between the sub-parting plane 7 of the core mold 3 and a bottom portion of the groove 60.

Figure 13:
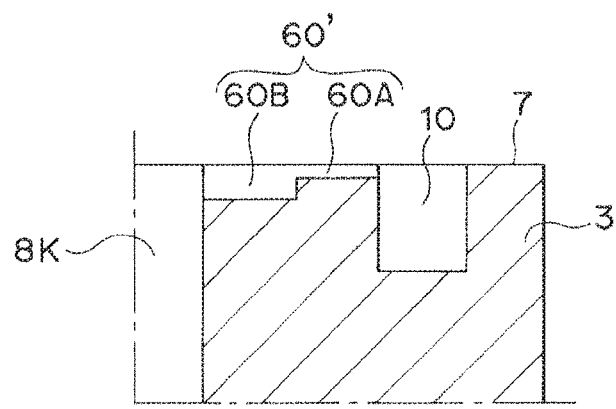
FIG. 13 is a cross sectional view schematically illustrating an another embodiment wherein (i) the through-hole which has the opening in the parting plane of the core mold composing the injection mold according to an embodiment of the present invention and (ii) a resin-passage are in a connection with each other via a groove provided in the parting plane.

FIG. 13 is a cross sectional view schematically illustrating an another embodiment wherein a through-hole 8K and the resin-passage 10 are in a connection with each other via a groove 60' provided in the sub-parting plane 7, the through-hole 8K having the opening in the sub-parting plane 7 of the core mold 3 composing the injection mold 1 according to an embodiment of the present invention. As shown in FIG. 13, it is preferable that the through-hole 8K and the resin-passage 10 are in a connection with each other via the groove 60' in the sub-parting plane 7. The groove 60' comprises a first groove portion 60A and a second groove portion 60B. One of end portions of the first groove portion 60A is in a connection with the resin passage 10 and other of the end portions of the first groove portion 60A is in a connection with the second groove portion 60B. One of end portions of the second groove portion 60B is in a connection with the first groove portion 60A and other of the end portions of the second groove portion 60B is in a connection with the through-hole 8K. The second groove portion 60B has a depth dimension which is larger than that of the first groove portion 60A with respect to the sub-parting plane 7. As shown in FIG. 13, the connection of the through-hole 8K with the resin passage 10 via the groove 60' allows the groove 60' to function as a support part for promoting an orientation of the gas in the cavity space into the through-hole 8K. Additionally, due to the larger depth dimension of the second groove portion 60B than that of the first groove portion 60A with respect to the sub-parting plane 7, an intrusion of the melt resin into the through-hole 8K can be further prevented as well as the gas in the cavity space can be oriented to the through-hole 8K via the groove 60' comprising the second groove portion 60B. In light of the above matters, while not intending to be bound by any specific embodiments, the second groove portion 60B may have its depth dimension of 1 µm to 100 µm. On the other hand, the first groove portion 60A has its depth dimension of 1 μm to 50 μm, preferably 1 μm to 20 μm. While not intending to be bound by any specific embodiments, the groove 60' may further comprise a third groove portion and a fourth groove portion, the third groove portion having a depth dimension which is smaller than that of the second groove portion 60B, the fourth groove portion having a depth dimension which is smaller than that of the third groove portion. This means that the groove 60' has a plurality of stepped portions.

Figure 14:
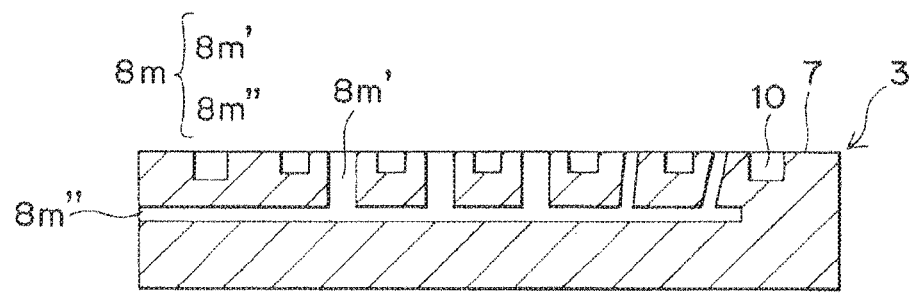
FIG. 14 is a cross sectional view schematically illustrating an embodiment wherein the through-hole comprises a first through-hole having the opening in a parting plane and a second through-hole in a connection with the first through-hole, the second through-hole extending to the outside of the injection mold.

FIG. 14 is a cross sectional view schematically illustrating an embodiment wherein the through-hole 8*m* comprises first through-holes 8*m*' and a second through-hole 8*m*", each of the first through-holes 8*m*' having an opening in the parting plane 7, the second through-hole 8*m*" being in a connection with the first through-hole 8*m*' and extending to the outside of the injection mold. As shown in FIG. 14, the through-hole 8*m* comprises (i) the first through-holes 8*m*' each of which has the opening in the parting plane 7 and (ii) the second through-hole 8*m*" which is in the connection with the first through-hole 8*m*' and extends to the outside of the injection mold. As shown in FIG. 14, a plurality of the first through-holes 8*m*' are provided. Each of the plurality of the first through-holes 8*m*' extends to a thickness direction of the core mold 3. The second through-hole 8*m*" extends to a direction which is different from that of the first through-hole 8*m*' as shown in FIG. 14. For example, the second through-hole 8*m*" extends to a direction which is substantially perpendicular to that of the first through-hole 8*m*' as shown in FIG. 14. Furthermore, the second through-hole 8*m*" is in a connection with each of the plurality of the first through-holes 8*m*'.

The through-hole 8*m* is a hole for discharging the gas in the cavity space to the outside of the injection mold, which may lead to an adherence and a deposition of a deposit to a surface forming the through-hole 8*m*, the deposit being caused by the gas in the cavity space. Thus, it is necessary to discharge a deposit which may adhere and may deposit to the surface forming the through-hole 8*m* to the outside of the injection mold by using the air blow, for example. In light of the above matters, the second through-hole 8*m*" composing the through-hole 8*m* is connected with each of the plurality of the first through-holes 8*m*', which allows a discharge of a deposit through the second through-hole 8*m*" to the outside of the injection-mold as a whole, the deposit adhering and depositing to a surface forming each of the first through-holes 8*m*'. Furthermore, a remaining gas within each of the first through-holes 8*m*' can be discharged through the second through-hole 8*m*" to the outside of the injection mold as a whole, the remaining gas corresponding to the gas in the cavity space. As shown in FIG. 14, the deposit and the remaining gas in the through-hole 8*m* are moved through the second through-hole 8*m*" to a side surface of the core mold 3, followed by being discharged to the outside of the core mold 3. Accordingly, a configuration of the through-hole 8*m* shown in FIG. 14 allows the deposit and the remaining gas in the through-hole 8*m* to be effectively discharged to the outside of the injection mold. Furthermore, the configuration of the through-hole 8*m* shown in FIG. 14 allows an improvement of a freedom degree for arranging the through-hole 8*m* in the injection mold without depending on a shape and a dimension of the mold.

Figure 15:
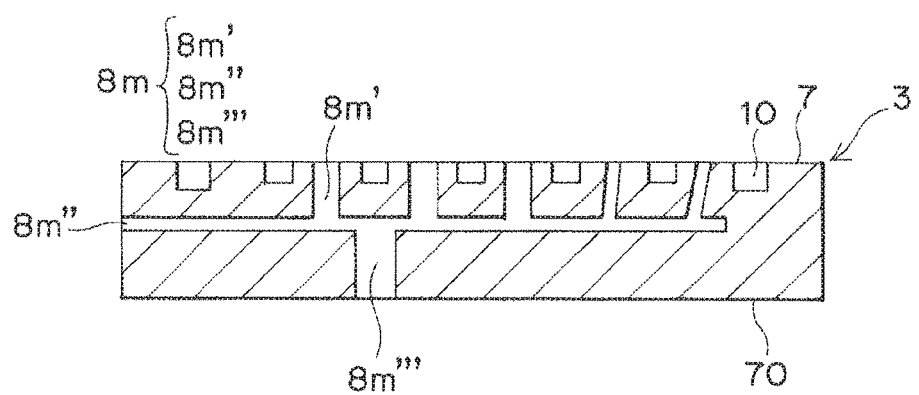
FIG. 15 is a cross sectional view schematically illustrating an embodiment wherein the through-hole comprises a first through-hole having the opening in the parting plane, a second through-hole in a connection with the first through-hole, and a third through-hole in a connection with the second through-hole, the second and third through-holes extending to the outside of the injection mold.

FIG. 15 is a cross sectional view schematically illustrating an embodiment wherein the through-hole 8*m* comprises first through-holes 8*m*' each of which has the opening in the parting plane 7, a second through-hole 8*m*" in a connection with each of the first through-holes 8*m*', and a third through-hole 8*m*'" in a connection with the second through-hole 8*m*", the second and third through-holes extending to the outside. Compared to the embodiment of FIG. 14, the through-hole 8*m* further comprises the third through-hole 8*m*'" as shown in FIG. 15. The third through-hole 8*m*'" extends to a direction which is different from an extension direction of the second through-hole 8*m*" as shown in FIG. 15. For example, the third through-hole 8*m*'" may extend to a direction which is substantially perpendicular to the extension direction of the second through-hole 8*m*" as shown in FIG. 15.

A configuration of the through-hole 8*m* shown in FIG. 15 allows a discharge of (i) a deposit adhering and depositing to a surface forming each of the first through-holes 8*m*' and (ii) a remaining gas in the each of the first through-holes 8*m*' through not only the second through-hole 8*m*" but also the third through-hole 8*m*'" to the outside of the injection-mold as a whole, the deposit being caused by the gas in the cavity space, the remaining gas corresponding to the gas in the cavity space. As shown in FIG. 15, the deposit and the remaining gas in the first through-holes 8*m*' are moved through the second through-hole 8*m*" to the side surface of the core mold 3, followed by being discharged to the outside of the core mold 3. Furthermore, the deposit and the remaining gas in the first through-holes 8*m*' are moved through the third through-hole 8*m*'" to an opposite surface 70 which is opposed to the parting plane 7 of the core mold 3, followed by being discharged to the outside of the core mold 3. Due to a configuration of the through-hole 8*m* shown in FIG. 15, a further adherence and deposition of the deposit to a surface forming the second through-hole 8*m*" can be prevented on a condition of a use of an air blow, and a further remaining of the gas in the second through-hole 8*m*" can be prevented on the condition of the use of the air blow. Accordingly, the configuration of the through-hole 8*m* shown in FIG. 15 allows the deposit and the remaining gas in the through-hole 8*m* to be more effectively and more accurately discharged to the outside of the injection mold.

A method for manufacturing the injection mold according to an embodiment of the present invention will now be described.

The injection mold according to an embodiment of the present invention can be mainly manufactured by a selective laser sintering method.

The selective laser sintering method is a method for manufacturing a three-dimensional shaped object by irradiating a powder material with a light beam. The selective laser sintering method can produce a desired three-dimensional shaped object by an alternate repetition of a powder-layer forming and a solidified-layer forming on the basis of the following seeps (1) and (2): the step (1) forming a solidified layer by irradiating a predetermined portion of a powder layer with a light beam, thereby allowing a sintering of the predetermined portion of the powder or a melting and subsequent solidification of the predetermined portion; and the step (2) forming another solidified layer by newly forming a powder layer on the formed solidified layer, followed by similarly irradiating the powder layer with the light beam. The three-dimensional shaped object to be obtained can be used as an injection mold in a case where a metal powder material is used as the powder material. Furthermore, when manufacturing the injection mold, according to an embodiment of the present invention by the selective laser sintering method, a laser-sintering/machining hybrid process is conducted, the hybrid process comprising an additional machining treatment of the three-dimensional shaped object.

Figure 16A:
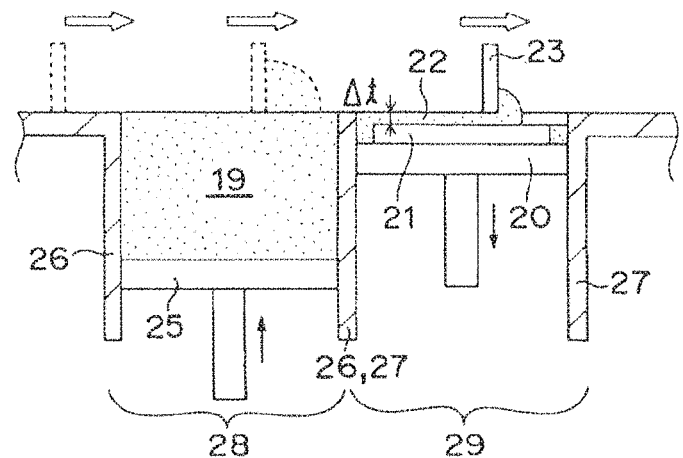
FIGS. 16A-16c are each a cross-sectional view schematically illustrating a laser-sintering/machining hybrid process in accordance with the selective laser sintering method.
Figure 16B:
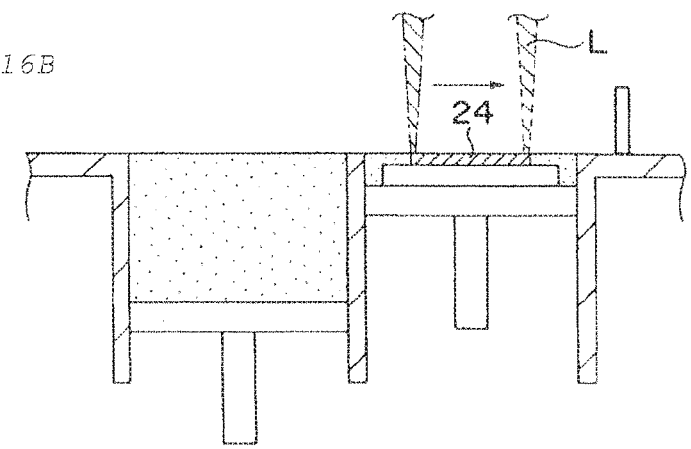
Figure 16C:
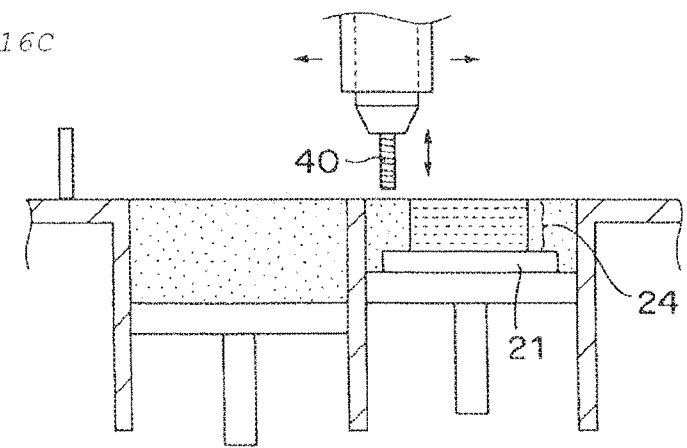

Each of FIGS. 16A-C is a cross-sectional view schematically illustrating a laser-sintering/machining hybrid process in accordance with the selective laser sintering method. As shown in FIGS. 16A-16C, a powder layer 22 with its predetermined thickness is firstly formed on a base plate 21 by a horizontal movement of a squeegee blade 23 (see FIG. 16A). Then, the predetermined portion of the powder layer is irradiated with the light beam L to form the solidified layer 24 (see FIG. 16B). When the solidified layer 24 having a hole at a desired portion is provided, the predetermined portion of the powder layer (i.e., a portion for forming the hole) is irradiated with the light beam L having an irradiation energy smaller than that to be needed to form the solidified layer 24 having no hole. Subsequently, another powder layer is newly provided on the formed solidified layer, and then is irradiated again with the light beam to form another solidified layer 24. Similarly, when the another solidified layer 24 having a hole at a desired portion is provided, the predetermined portion of the powder layer (i.e., a portion for forming the hole) is irradiated with the light beam L having an irradiation energy smaller than that to be needed to form the solidified layer 24 having no hole. In this way, the powder-layer forming and the solidified-layer forming are alternately repeated, and thereby allowing the solidified layers 24 to be stacked with each other. Furthermore, a side surface of the stacked solidified layers 24 is subjected to a machining treatment by using a milling head 40 (see FIG. 16C). With respect to a predetermined portion of the solidified layers irradiated with the light beam L having the irradiation energy smaller than that to be needed to form the solidified layer 24, powders in the predetermined portion are removed by providing a vibration from the outside of the solidified layers 24 to inside of the solidified layers 24 or directly sucking the powders by a suction machine. Thus, a three-dimensional shaped object with a through-hole having an opening in a parting plane and extending to the outside of the three-dimensional shaped object is obtained. The lowermost solidified layer 24 is provided such that it is in a connection with the base plate 21. Accordingly, an integration of the three-dimensional shaped object and the base plate can be obtained. The integrated "three-dimensional shaped object" and "base plate" can be used as the metal mold.

According to the above selective laser sintering method, an injection mold according to an embodiment of the present invention can be manufactured in a short time, the injection mold having a through-hole for discharging the gas in the cavity space, the through-hole having an opening in the parting plane.

A method for manufacturing the injection mold according to an embodiment of the present invention is not limited to the selective laser sintering method as described above. For example, the following methods may be adopted to form a resin-passage, a through-hole penetrated from a parting plane of the metal mold to an opposite surface opposed to the parting plane, and a groove provided in the parting plane, the groove connecting the through-hole having the opening in the parting plane with the resin passage. Specifically, at a point in time after manufacturing an article with an optional shape, a predetermined portion of the article is subjected to an additional process to form the resin-passage, the through-hole, and the groove provided in the parting plane, the additional process being selected from a laser process, a machining process with such as a drill and an end mill, and/or a waterjet process, the predetermined portion of the article being a portion at which a shape of the article is needed to be changed.

Although some embodiments of the injection mold according to an embodiment of the present invention have been hereinbefore described, the present invention is not limited to these embodiments. It will be readily appreciated by those skilled in the art that various modifications are possible without departing from the scope of the present invention.

In an embodiment of the present invention, the core mold composing the injection mold includes the through-hole having its opening in the parting plane of the core mold. While not intending to be bound by such the embodiments, the cavity mold may include a through-hole having its opening in the parting plane of the cavity mold. In an embodiment of the present invention, the cavity mold has a flat surface opposed to an opening region of the resin-passage in the core mold. While not intending to be bound by such the embodiments, the cavity mold may have the resin-passage.

It should be noted that the present invention as described above includes the following aspects.

The first aspect: An injection mold composed of a core mold and a cavity mold, in which a cavity space is formed when the core and cavity molds are in a contact with each other, the cavity space surrounding a plurality of contact areas between the core and cavity molds, wherein at least one of the core and cavity molds has a through-hole which has an opening in a parting plane of the core and cavity molds and extends from the opening to an outside of the injection mold, the parting plane corresponding to the contact areas between the core and cavity molds.

The second aspect: The injection mold according to the first aspect, wherein the cavity space comprises:

a plurality of first cavity spaces, one end of each of the first cavity spaces being in a connection with a gate which corresponds to an inlet for injecting a melt resin;

a plurality of second cavity spaces, one end of each of the second cavity spaces being in a connection with each of the first cavity spaces; and a plurality of third cavity spaces, each of which being in a connection with the second cavity spaces, and thereby the adjacent second cavity spaces being in a connection with each other via the third cavity spaces;

wherein the second and third cavity spaces surround the parting plane in which the opening is provided.

The third aspect: The injection mold according to the second aspect, wherein the parting plane has the opening in its region surrounded by the second and third cavity spaces.

The fourth aspect: The injection mold according to any one of the first to third aspects, wherein each of sub-parting planes of the parting plane has a plurality of the openings.

The fifth aspect: The injection mold according to any one of the first to fourth aspects, wherein a distance between an edge of the opening and an edge of the cavity space is constant in the parting plane.

The sixth aspect: The injection mold according to any one of the first to fifth aspects, wherein the through-hole has a tapered structure with a diameter of the through-hole being decreased toward the opening.

The seventh aspect: The injection mold according to any one of the first to sixth aspects, wherein a melted and subsequently solidified metal powder is provided within the through-hole.

The eighth aspect: The injection mold according to the seventh aspect, wherein a porous part is additionally provided within the through-hole, the porous part blocking the opening of the through-hole.

The ninth aspect: The injection mold according to any one of the first to eighth aspects, wherein a connection part is provided in the through-hole, the connection part serving to connect side surfaces with each other.

The tenth aspect: The injection mold according to the first to ninth aspects, wherein the through-hole and the cavity space are in a connection with each other via a groove provided in the parting plane.

The eleventh aspect: The injection mold according to the tenth aspect, wherein the groove comprises:

a first groove portion in a connection with the cavity space; and a second groove portion in a connection with the first groove portion, wherein the second groove portion has a lager depth than that of the first groove portion, the depth being a dimension with respect to the parting plane.

The twelfth aspect: The injection mold according to any one of the first to eleventh aspects, wherein the through-hole comprises:

a first through-hole having the opening in the parting plane; and a second through-hole in a connection with the first through-hole, the second through-hole extending to the outside.

The thirteenth aspect: The injection mold according to any one of the first to the twelfth aspects, wherein the injection mold has the through-hole obtainable by a selective laser sintering method.

The fourteenth aspect: A molded article in a form of a filter, the article being manufactured by the injection mold according to any one of the first to thirteenth aspects.

INDUSTRIAL APPLICABILITY

The injection mold according to an embodiment of the present invention is used to manufacture a molded article in the form of the filter, the molded article being used as the air purifier.

CROSS REFERENCE TO RELATED PATENT APPLICATION

The present application claims the right of priority of Japanese Patent Application No. 2014-201903 (filed on Sep. 30, 2014, the title of the invention: "INJECTION MOLD"), the disclosure of which is incorporated herein by reference.

EXPLANATION OF REFERENCE NUMERALS

1 Injection mold
2 Cavity mold
3 Core mold
4 First resin passage
5 Second resin passage
6 Third resin passage
7 Parting plane
8, 8C, 8D, 8E, 8F, 8G, 8H, 8I, 8J, 8K, 8m Through-hole
8Ia, 8Ib Side surface of through-hole
8m' First through-hole
8m" Second through-hole
8m'" Third through-hole
9 Gate
10 Resin passage
13, 13E, 13F, 13G Tip portion
14, 14E, 14F, 14G Internal portion
15, 15E, 15G, 15F Opening
16 Metal powder
17, 17G Porous part
18 Hole
50 Connection part
60, 60' Groove
60A First groove portion
60B Second groove portion
70 Plane opposed to parting plane
80 Molded article in form of filter

The invention claimed is:

1. An injection mold composed of a core mold and a cavity mold, in which a cavity space is formed when the core and cavity molds are in a contact with each other, the cavity space surrounding a plurality of contact areas between the core and cavity molds, wherein at least one of the core and cavity molds has a through-hole which has an opening in a parting plane of the core and cavity molds and extends from the opening to an outside of the injection mold, the parting plane corresponding to the contact areas between the core and cavity molds, and wherein the through-hole and the cavity space are in a connection with each other via a groove provided in the parting plane.

2. The injection mold according to claim 1, wherein each of sub-parting planes of the parting plane has a plurality of the openings.

3. The injection mold according to claim 1, wherein a distance between an edge of the opening and an edge of the cavity space is constant in the parting plane.

4. The injection mold according to claim 1, wherein the through-hole has a tapered structure with a diameter of the through-hole being decreased toward the opening.

5. The injection mold according to claim 1, wherein a connection part is provided in the through-hole, the connection part serving to connect side surfaces with each other.

6. The injection mold according to claim 1, wherein the groove comprises:

a first groove portion in a connection with the cavity space; and a second groove portion in a connection with the first groove portion, wherein the second groove portion has a lager depth than that of the first groove portion, the depth being a dimension with respect to the parting plane.

7. The injection mold according to claim 1, wherein the through-hole comprises:

a first through-hole having the opening in the parting plane; and a second through-hole in a connection with the first through-hole, the second through-hole extending to the outside.

8. The injection mold according to claim 1, wherein the injection mold has the through-hole obtainable by a selective laser sintering method.

9. A molded article in a form of a filter, the article being manufactured by the injection mold according to claim 1.

10. The injection mold according to claim 1, wherein the cavity space comprises:

a plurality of first cavity spaces, one end of each of which being in a connection with a gate which corresponds to an inlet for injecting a melt resin;

a plurality of second cavity spaces, one end of each of which being in a connection with each of the first cavity spaces; and a plurality of third cavity spaces, each of which being in a connection with the second cavity spaces, and thereby the adjacent second cavity spaces being in a connection with each other via the third cavity spaces;

wherein the second and third cavity spaces surround the parting plane in which the opening is provided.

11. The injection mold according to claim 10, wherein the parting plane has the opening in its region surrounded by the second and third cavity spaces.

12. The injection mold according to claim 1, wherein a melted and subsequently solidified metal powder is provided within the through-hole.

13. The injection mold according to claim 12, wherein a porous part is additionally provided within the through-hole, the porous part blocking the opening of the through-hole.

* * * * *